US011710193B2

(12) United States Patent
Trivedi

(10) Patent No.: US 11,710,193 B2
(45) Date of Patent: *Jul. 25, 2023

(54) SYSTEM AND METHOD FOR PROVIDING A SPEND MEMORY RECORD

(71) Applicant: Capital One Services, LLC, McLean, VA (US)

(72) Inventor: Dwij Trivedi, Oakton, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/505,536

(22) Filed: Oct. 19, 2021

(65) Prior Publication Data

US 2022/0036479 A1    Feb. 3, 2022

Related U.S. Application Data

(63) Continuation of application No. 16/429,114, filed on Jun. 3, 2019, now Pat. No. 11,188,987, which is a continuation of application No. 14/856,940, filed on Sep. 17, 2015, now Pat. No. 10,325,322.

(60) Provisional application No. 62/051,398, filed on Sep. 17, 2014.

(51) Int. Cl.
  *G06Q 40/12*    (2023.01)
  *G06Q 50/00*    (2012.01)
  *G06Q 40/02*    (2023.01)

(52) U.S. Cl.
  CPC .......... *G06Q 40/128* (2013.12); *G06Q 40/02* (2013.01); *G06Q 50/01* (2013.01)

(58) Field of Classification Search
  None
  See application file for complete search history.

(56) References Cited

U.S. PATENT DOCUMENTS

| | | |
|---|---|---|
| 2011/0093709 A1 | 4/2011 | Lunt et al. |
| 2011/0270748 A1 | 11/2011 | Graham, III et al. |
| 2012/0203644 A1 | 8/2012 | Phillips |
| 2013/0211913 A1* | 8/2013 | Ross .................. G06Q 30/0269 |
| | | 705/14.66 |
| 2014/0040086 A1* | 2/2014 | Abbatiello ......... G06Q 20/4016 |
| | | 705/35 |

(Continued)

*Primary Examiner* — Scott A Zare
(74) *Attorney, Agent, or Firm* — Troutman Pepper Hamilton Sanders LLP; Christopher J. Forstner; John A. Morrissett

(57) ABSTRACT

Systems and methods include a database maintained by a financial institution that stores transaction data associated with a previous financial transaction performed via a financial account of a respective account holder, wherein the transaction data comprises a transaction location and a transaction timestamp, a spend memory processor of the financial institution that retrieves the transaction data from the database, interacts with a social linking application programming interface (API) to receive, via a network, social data from a social networking site, wherein the social data comprises a social location and a social timestamp, compares the social data to the transaction data, and creates a spend memory record based on one or more similarities between the social data and the transaction data, and a communication interface of the financial institution that provides the spend memory record to a mobile device associated with the account holder.

20 Claims, 6 Drawing Sheets

(56) References Cited

U.S. PATENT DOCUMENTS

| | | | |
|---|---|---|---|
| 2014/0129493 A1 | 5/2014 | Leopold | |
| 2014/0207572 A1* | 7/2014 | Poole | G06Q 40/02 |
| | | | 705/14.53 |
| 2014/0222561 A1 | 8/2014 | Mathur | |
| 2014/0279518 A1 | 9/2014 | Acuna-Rohter | |
| 2014/0379584 A1 | 12/2014 | Ward | |
| 2015/0081349 A1* | 3/2015 | Johndrow | G06Q 20/405 |
| | | | 705/5 |
| 2015/0088715 A1 | 3/2015 | Votaw et al. | |
| 2015/0088716 A1* | 3/2015 | Votaw | G06Q 40/02 |
| | | | 705/35 |
| 2015/0161610 A1 | 6/2015 | Sahadevan et al. | |
| 2015/0371339 A1 | 12/2015 | Pastore et al. | |

\* cited by examiner

SYSTEM AND METHOD FOR PROVIDING A SPEND MEMORY RECORD

CROSS-REFERENCE TO RELATED APPLICATIONS

This application is a continuation of, and claims priority under 35 U.S.C. § 120 to, U.S. patent application Ser. No. 16/429,114, filed Jun. 3, 2019, which is a continuation of U.S. patent application Ser. No. 14/856,940, now U.S. Pat. No. 10,325,322, filed Sep. 17, 2015, which claims the benefit of, and priority under 35 U.S.C. § 119(e) to, U.S. Provisional Patent Application No. 62/051,398, filed on Sep. 17, 2014, the entire contents of each of which are fully incorporated herein by reference.

This application contains subject matter related to U.S. patent application Ser. No. 14/168,107, filed on Jan. 30, 2014, and U.S. patent application Ser. No. 14/031,263, filed on Sep. 19, 2013, the entire contents of which are incorporated herein by reference.

FIELD OF THE DISCLOSURE

The present disclosure relates to systems and methods for providing a financial statement that includes memory-enhancing information to provide social context for a user's transaction history.

BACKGROUND OF THE DISCLOSURE

Currently, a user's financial statement (e.g., a credit card statement) provides a list of purchases made during that month without much, if any, additional context. A user may have been on a trip and made multiple purchases while taking photos around the same time. The financial statement may not reflect the user's social activities that coincided with the purchases reflected on the statement. The user may not remember which transactions are associated with which social events.

These and other drawbacks exist.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

The following description is intended to convey a thorough understanding of the embodiments described by providing a number of specific example embodiments and details involving systems and methods for providing a financial statement that includes memory-enhancing information to provide social context for a user's transaction history. It should be appreciated, however, that the present disclosure is not limited to these specific embodiments and details, which are examples only. It is further understood that one possessing ordinary skill in the art, in light of known systems and methods, would appreciate the use of the disclosure for its intended purposes and benefits in any number of alternative embodiments, depending on specific design and other needs. A financial institution and system supporting a financial institution are used as examples for the disclosure. The disclosure is not intended to be limited to financial institutions only.

In an example embodiment, a user having a financial account at a financial institution may make one or more purchases. Around the same time, the user may upload data to a mobile device via, for example, a social media account (e.g., photos, status updates). The social data may be geotagged and include a timestamp. For example, a user device may geotag a photo to include location data indicating the location where the photo was taken. In various embodiments, the social networking site that supports the social media account may geotag the photo when the user device uploads the photo to the social media account. The transaction data for the purchases may also be geotagged and include a timestamp. A spend memory processor may receive the transaction data on a regular basis. The spend memory processor may also retrieve and/or utilize social data from the user's social media account. In various embodiments, the spend memory processor may also retrieve and/or utilize local data from the user's mobile device (e.g., photos, phone call records). The spend memory processor may compare the transaction data to the social data and/or local data and create an enhanced financial statement (a "spend memory record") that links social data and local data with transaction data based on similarities in the timestamps, location data, and other relevant information. For example, if a photo from the user's social media account was geotagged to indicate it was taken on Aug. 20, 2014 at 2:30 PM at Pier 39 in San Francisco, Calif., and the user's transaction data indicates that the user bought lunch at Pier 39 on Aug. 20, 2014 at 12:30 PM, the spend memory processor may create a spend memory record that includes the transaction data for the coffee purchase and the photo, based on relative similarities between the location data and timestamps.

Figure 1:
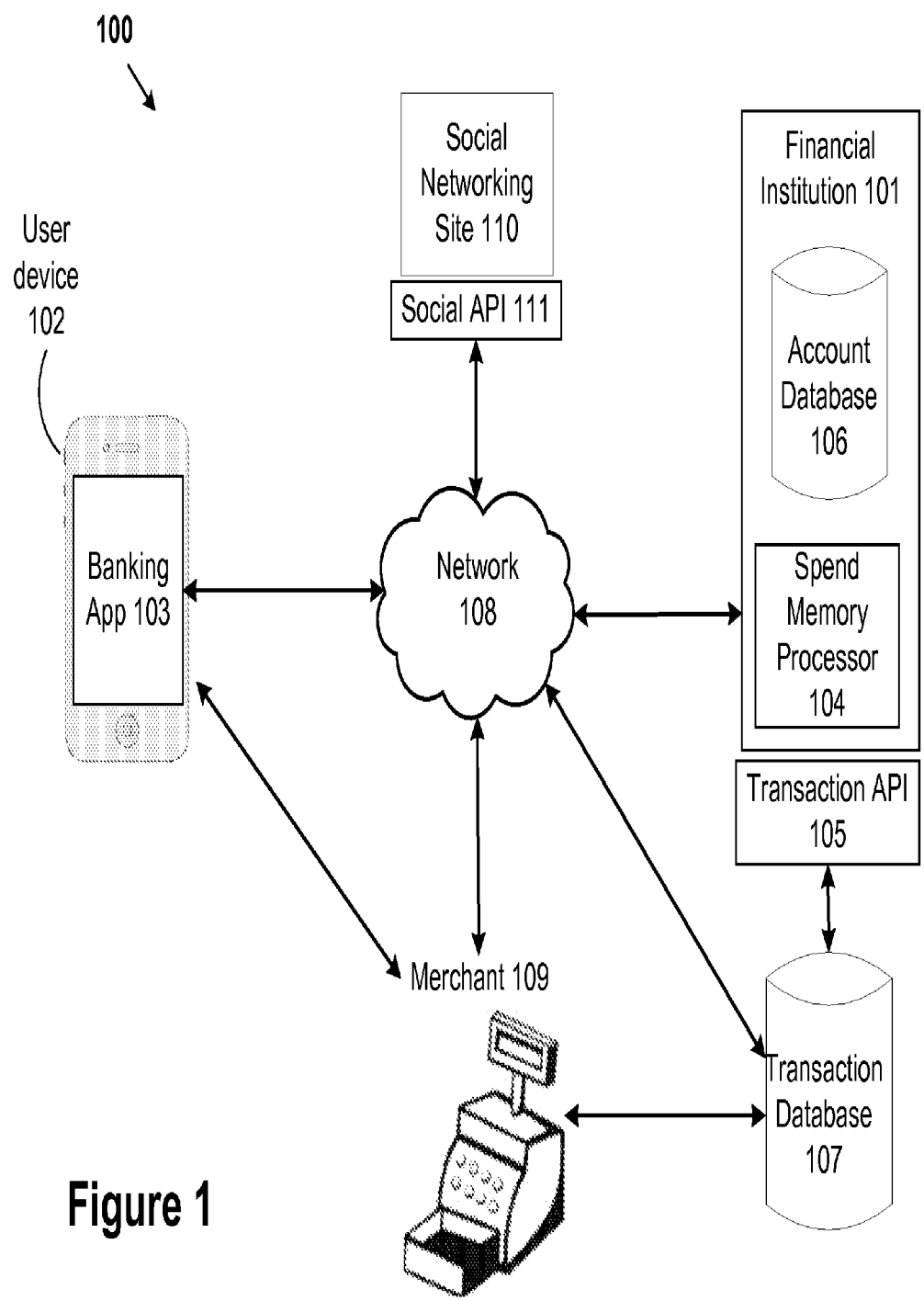
FIG. 1 depicts a schematic diagram of a system for providing a spend memory record to an account holder at his or her mobile device according to an example embodiment of the disclosure.

FIG. 1 depicts an example embodiment of a system for providing a spend memory record that includes information to provide social context for a user's transaction history, according to various embodiments of the disclosure. As referred to herein, a "spend memory record" may include, for example, an interactive, feature-rich purchase history associated with a user account (e.g., a credit and/or debit account) as shown and described herein. Referring to FIG. 1, the system may include various network-enabled computer systems, including, as depicted in FIG. 1 for example, a financial institution 101; comprising a spend memory processor 104, and an account database 106, which may be included as separate processors or combined into a single processor or device having the multiple processors. The system may also include a social networking site 110. Examples of social networking sites include, without limitation, Instagram, Facebook, MySpace, Google+, LinkedIn, Twitter, Pintrest, etc. The social networking site may include a plurality of social networking accounts created by one or more users. The users may also be account holders with the financial institution 101.

In various examples, the spend memory processor 104 and/or database 105 may be separate from financial institution 101. For example, spend memory processor 104 may be integrated into social networking site 110. Social networking site 110, merchant 109, and spend memory processor 104 may comprise one or more network-enabled computers. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. The one or more network-enabled computer systems may also include one or more software applications to enable the creation and provisioning of spend memory statements.

The components depicted in FIG. 1 may store information in various electronic storage media, such as, for example, account database 106 and transaction database 107. Electronic information, files, and documents may be stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

The components depicted in FIG. 1 may be coupled via one or more networks, such as, for example, network 108. Network 108 may be one or more of a wireless network, a wired network or any combination of wireless network and wired network. For example, network 108 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving a data signal.

In addition, network 108 may include, without limitation, telephone lines, fiber optics, IEEE Ethernet 902.3, a wide area network ("WAN"), a local area network ("LAN"), or a global network such as the Internet. Also network 108 may support an Internet network, a wireless communication network, a cellular network, or the like, or any combination thereof. Network 108 may further include one network, or any number of the example types of networks mentioned above, operating as a stand-alone network or in cooperation with each other. Network 108 may utilize one or more protocols of one or more network elements to which they are communicatively coupled. Network 108 may translate to or from other protocols to one or more protocols of network devices. Although network 108 is depicted as a single network, it should be appreciated that according to one or more embodiments, network 108 may comprise a plurality of interconnected networks, such as, for example, the Internet, a service provider's network, a cable television network, corporate networks, and home networks.

In various example embodiments, an account holder may be any individual or entity that desires to conduct a financial transaction using one or more accounts held at one or more financial institutions. An account may include any place, location, object, entity, or other mechanism for holding money or performing transactions in any form, including, without limitation, electronic form. An account may be, for example, a credit card account, a prepaid card account, stored value card account, debit card account, check card account, payroll card account, gift card account, prepaid credit card account, charge card account, checking account, rewards account, line of credit account, credit account, mobile device account, an account or service that links to an underlying payment account already described, or mobile commerce account. An account may or may not have an associated card, such as, for example, a credit card for a credit account or a debit card for a debit account. The account may enable payment using biometric authentication, or contactless based forms of authentication, such as QR codes or near-field communications. The account card may be associated or affiliated with one or more social networking sites, such as a co-branded credit card.

User device 102 may be, for example, a handheld PC, a phone, a smartphone, a PDA, a tablet computer, or other device. User device 102 may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device. Device 102 may include device-to-device communication abilities using, for example, RFID transmitters and receivers, cameras, scanners, and/or Near Field Communication (NFC) capabilities, which may allow for communication with other devices by touching them together or bringing them into close proximity. Example NFC standards include ISO/IEC 18092:2004, which defines communication modes for Near Field Communication Interface and Protocol (NFCIP-1). For example, device 102 may be configured using the Isis Mobile Wallet™ system, which is incorporated herein by reference. Other exemplary NFC standards include those created by the NFC Forum. Element 102c may use Bluetooth technology built into device 102. Element 102c may use iBeacon technology and/or Bluetooth Low Energy (BLE) capabilities.

A financial institution 101 may be, for example, a bank, other type of financial institution, including a credit card provider, for example, or any other entity that offers accounts to customers. Financial institution 101 may have one or more databases 106 comprising information about an account holder's accounts.

The user of user device 102 may have a mobile banking application 103 on user device 102. Mobile banking application 103 may allow the user to access his accounts with financial institution 101. The accounts may be associated with a username and password. Upon logging in for mobile banking application 103, the user may be presented with a "spend memory" option. If the user selects the "spend memory" option, the user may be presented with a request to link his social media accounts (with social networking site 110) to his one or more financial accounts with financial institution 101. The user may provide a username and password associated with his one or more social media accounts at social networking site 110 (i.e., the identifying information that is needed to access the social media accounts). The user may use mobile banking application 103 to create a set of permissions associated with his one or more social media accounts. The set of permissions may include the types of social data that spend memory processor 104 can collect from the user's social media accounts. Social data may include photos and videos that the user posts to his social media accounts. Social data can include tweets, pins, tags, check-ins, likes, status updates, comments, profile information, posts, and other information. The set of permissions may allow spend memory processor to retrieve certain types of social data (e.g., photos) and not others (e.g., no status updates or comments).

Social networking site 110 may create a hashcode based on the user's identifying information and the set of permissions. Social networking site 110 may provide the hashcode as a token to spend memory processor via a social application programming interface (API) 111. Spend memory processor 104 may associated the token with accounts for the user of user device 102 (for example, by storing the token in account database 106). The token may include the set of permissions provided by the user of user device 102. Spend memory processor 104 may regularly request social data from social networking site 110. Each time spend memory processor 104 requests new social data, the request will include the token. Social networking site 110 may provide new social data to spend memory processor 104 based on the set of permissions associated with the token. Spend memory processor may receive the social data associated with the user and save it with the user's account information in account database 106.

The "spend memory" feature may also include an option to permit spend memory processor 104 to periodically access and/or retrieve local data from user device 102. Local data may include, for example, photos and videos that the user took that are stored on user device 102. Local data may include call logs (i.e., a list of incoming and outgoing calls and/or text messages). The social data and/or the local data may include a timestamp (indicating the date and time at which the data was created). The social data and/or local data may be geotagged at the time it is created (e.g., by user device 102, social networking site 110, network 108, or by a third party). Data that is geotagged includes location data indicating the current location of user device 102 at the time the data was created and/or uploaded. In various example embodiments, various location services on user device 102 may be used to determine the device's current location. For example, user device 102 may use information from cellular, Wi-Fi, Global Positioning System (GPS) networks and/or iBeacons or other similar devices to determine an approximate location. User device 102 may, for example, periodically send the geotagged location of nearby Wi-Fi hotspots and cell towers in an anonymous and/or encrypted form to an aggregator that may improve location accuracy. Where, for example, the mobile device is an Apple device (e.g., an iPhone, iPad, iPod, smart watch, etc.) the Core Location framework may be used to receive and monitor the current location of the mobile device. For example, a mobile banking application may link to Core Location framework in an Xcode project to enable the mobile banking application to locate the current position of the device. Where for example, the mobile device is running the Google Android platform, the ACCESS COARSE LOCATION and FINE strings may be used by the mobile banking application to obtain the location of the mobile device.

Figure 2:
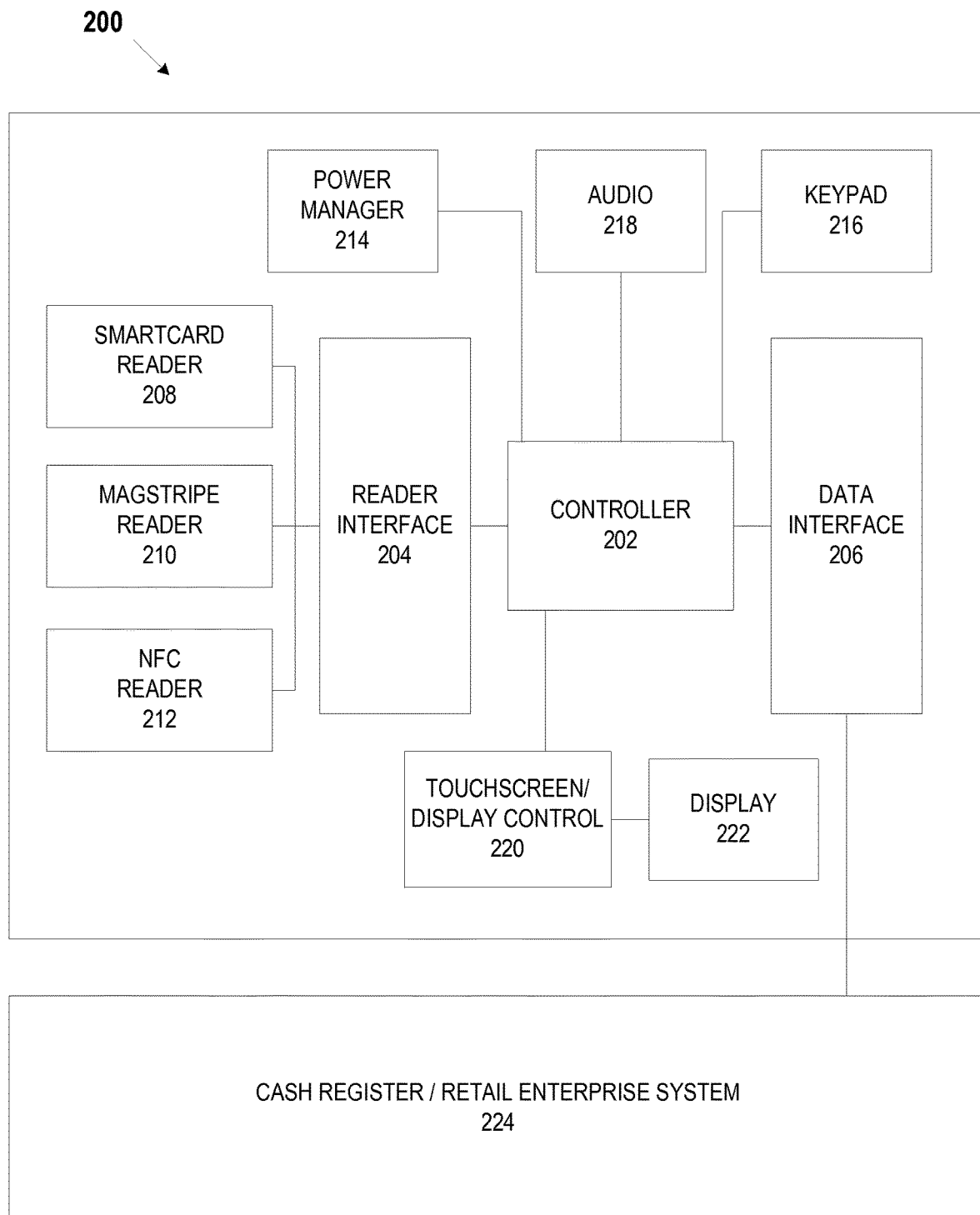
FIG. 2 depicts a schematic diagram of a point of sale system that may be associated with providing a spend memory record to an account holder at his or her mobile device according to an example embodiment of the disclosure.

The user of user device 102 may make a series of purchases with merchant 109 using his account with financial institution 101. The purchases may be made at a Point of Sale (PoS) terminal associated with merchant 109 (such as PoS device 200 as shown in FIG. 2). Merchant 109, financial institution 101, and/or a third-party may create transaction data based on each purchase. The transaction data may be stored in transaction database 107 by the merchant 109 once the transaction is completed. Spend memory processor 104 may receive the transaction data from transaction database 107 via transaction API 105. The transaction data may include meta-data information such as a timestamp indicating the date and time of the transaction, the transaction amount, a merchant identifier (associated with merchant 109), merchant 109's location (e.g., a physical address and/or GPS coordinates), a merchant logo, a merchant category, the last four digits of the card used for the transaction, etc. Referring back to FIG. 1, spend memory processor 104 may be configured to receive transaction data via network 108 and/or a separate network (not shown). The transaction data may be associated with a financial transaction performed by the account holder at merchant 109 using user device 102. The account holder may perform the transaction using one or more mobile payment accounts associated with user device 102. The account holder may purchase one or more goods or services at merchant 109, and the resulting expenses may be charged against the account holder's mobile payment account.

Spend memory processor 104 may store the transaction data in account database 106. The transaction data may be received on an hourly, daily, weekly, monthly, or other regular basis. Spend memory processor 104 may request the transaction data from transaction database 107 at irregular intervals. Spend memory processor 104 may request transaction data for a user each time the user logs in to mobile banking application 103.

Spend memory processor 104 may compare a user's transaction data with social data and local data received from social networking site 110 and/or user device 102. Spend memory processor 104 may compare the timestamp and location data associated with a transaction (transaction location data and transaction timestamp data) with timestamp and location data associated with the social data and local data (social location data and social timestamp data) received from social networking site 110 and/or user device 102. Spend memory processor 104 may generate an enhanced transaction record ("spend memory statement") based on one or more matches between the transaction location data and transaction timestamp data with the social location data and social timestamp data. The spend memory statements may include photos, status updates, posts, tweets, pins, and other relevant social data next to transaction records to provide context for each transaction.

Spend memory processor 104 may match transaction location data with social location data based on one or more location thresholds. The location threshold may indicate a match based on the distance between the transaction location data and the social location data (e.g., within 100 yards, 1 mile, 5 miles, etc.). The location threshold may indicate a match based on the proximity between the transaction location data and the social location data (e.g., same block, same city, same zip code, same street address, same county, same state). Spend memory processor 104 may match transaction timestamp data with social timestamp data based on one or more time thresholds. The time threshold may indicate a match based on the difference in time between the transaction timestamp data and the social timestamp data (e.g., within 1 hour, 12 hours, 1 day, 1 week, etc.). Spend memory processor 104 may retrieve transaction data for transactions that were made in-person by the user of user device 102. Spend memory processor 104 may determine a match between transaction data and social data based on one or more combinations of location threshold matches and timestamp threshold matches. In various embodiments, spend memory processor 104 may apply only a location threshold to the comparison between the transaction data and the social data if the comparison meets one or more of the time thresholds, and vice versa.

In one example, a user may travel to the Outer Banks in North Carolina for a vacation over Labor Day weekend (August 29-September 1). While on vacation, on August 30, the user may purchase gas at a station in Nags Head, N.C. and eat lunch there at a local restaurant. On the same day, the user may spend several hours at a beach near Kitty Hawk (from 2 pm-6 pm), take several photos and save them on user device 102, and upload a photo of the beach to his social media account at social networking site 110. The user may also "check-in" at Kitty Hawk by uploading this location to his social media account at social networking site 110. Spend memory processor 104 may receive transaction data from transaction database 107. The transaction data may include transaction records for the gas station purchase and the restaurant purchase. The transaction records may include the transaction location data (e.g., the location of the gas station and restaurant as a physical address and/or GPS coordinates). The transaction records may include transaction timestamps for each purchase. Spend memory processor 104 may receive social data from social networking site 110 for that user's social media account (assuming the user had previously opted-in to the spend memory service). Spend memory processor 104 may transmit a request for social data to social networking site 110. The request may include the hashcode that was previously created when the user opted-in for the spend memory service. Social networking site 110 may provide social data for the user's social networking site to spend memory processor 104 based on the one or more limitations associated with the hashcode (as described above). Spend memory processor 104 may also receive and/or pull local data from user device 102, such as photos, call records, videos, notes, etc.

Spend memory processor 104 may compare the social location data and social timestamp data with the transaction location data and transaction timestamp data. In this example, the social location data for the "check-in" would be near Kitty Hawk, N.C. The social location data may be GPS coordinates. The social location data for the photo uploaded to social networking site 110, as well as the photos stored at user device 102, may be similar. The social timestamp data may show the date and time (Aug. 30, 2014, 2:30:52 PM) for the photos and/or "check-in". Spend memory processor 104 may determine that the transactions occurred on the same day as the social data. Spend memory processor 104 may apply a time threshold of 12 hours, and determine that the transactions occurred within 12 hours of the social data being created and/or uploaded. Spend memory processor 104 may apply a location threshold of 20 miles and determine that the social data (photos, check-in) were created and/or uploaded (in Kitty Hawk, N.C.) less than 20 miles from where the transactions took place (in Nags Head, N.C.).

Spend memory processor 104 may create a spend memory record that includes the transaction data and the social data that are associated based on one or more matches. The spend memory record may include transaction data for the gas station and restaurant purchases. The transaction data in the spend memory record may include the amount spent, an account number, the date and time, the location, the name of the merchant, etc. The spend memory record may include social data based on the one or more matches described above. The spend memory record may show the photo of the beach at Kitty Hawk next to the transaction data. The spend memory record may include the "check-in" from the social data. The spend memory record may include text indicating that the purchases were made during a vacation to the Outer Banks.

Spend memory processor 104 may provide the spend memory record to user device 102. The spend memory record may be provided as a Graphical User Interface (GUI). The user may access the spend memory record using mobile banking application 103 (e.g., by selecting a link labeled "view spend memory record for August 2014" on the interface provided by mobile banking application 103). In various embodiments, the spend memory record may include one or more interactive features that query the user to confirm whether the social data in the spend memory record was properly matched to the transaction data. In this way, the spend memory record may be used as a fraud control mechanism for a financial institution. For example, the spend memory record interface could include components that enable an account holder to confirm, validate and/or otherwise authorize a particular transaction.

Figure 5A:
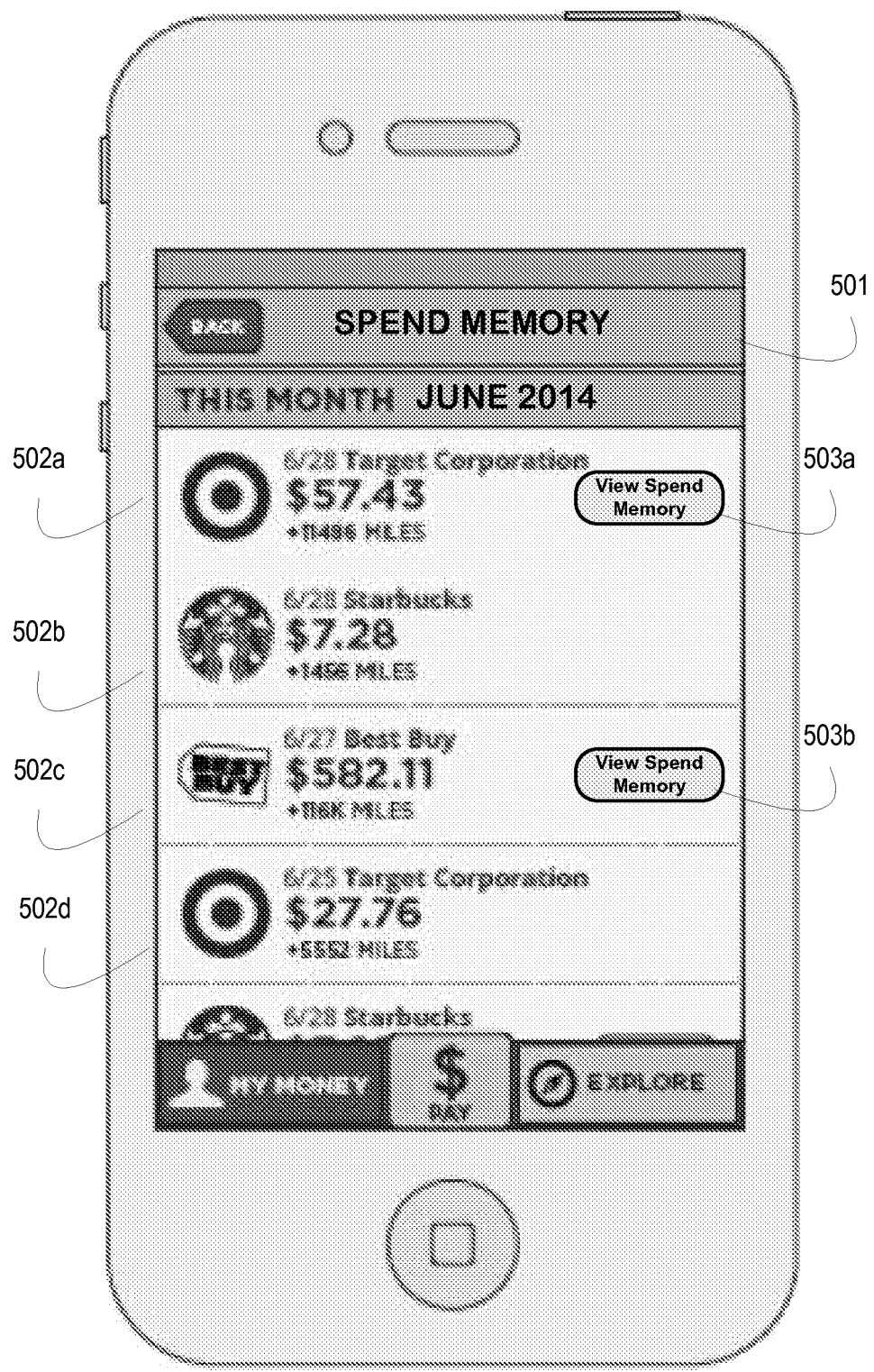
FIGS. 5A-5B depict screenshots of a spend memory record on a mobile device, according to an example embodiment of the disclosure.
Figure 5B:
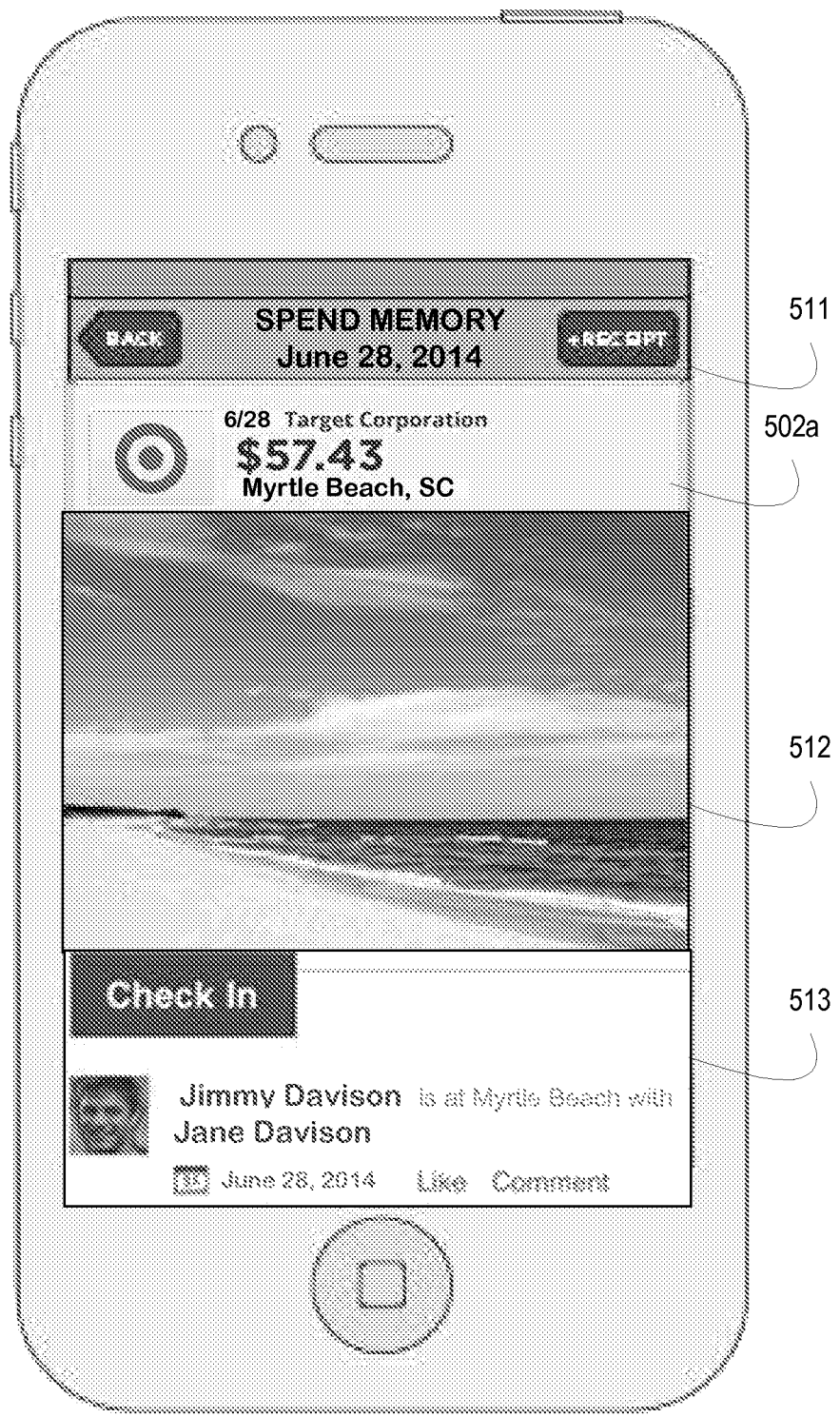

FIGS. 5A and 5B depict an example embodiment of a spend memory record, shown on the screen of a user device. The user may access the spend memory record using mobile banking application 103. As shown in FIG. 5A, the spend memory record 501 may list a series of transactions 502. The transaction data for each transaction 502a-502d may include the date, transaction amount, merchant identifiers, and other relevant information. The spend memory may include an interactive feature 503a, 503b allowing the user to "view spend memory" 503a, 503b information for each transaction (if spend memory information is available). If the user selects the "view spend memory" option for a specific transaction (or transactions), mobile banking application 103 may display the screen shown in FIG. 5B. In FIG. 5B, the spend memory record 511 may show the transaction data for that specific date (or dates). In this example, the date is Jun. 28, 2014, and the transaction was at a Target in Myrtle Beach, S.C. The spend memory record may show social data that was associated with the transaction by spend memory processor 104 (based on one or more matches as described above). In this example, the social data includes a photo 512 and "check in" status 513 from Myrtle Beach, S.C. The user may view this spend memory record, or select other spend memory records associated with other transactions (from FIG. 5A).

FIG. 2 depicts an example Point of Sale (PoS) device 200. PoS device 200 may provide the interface at what a customer or end user makes a payment to the merchant in exchange for goods or services. The PoS device 200 may provide the transaction data to the merchant and/or a third-party processor and/or transaction database 107. In various embodiments, numerous features described with respect to PoS device 200 may be implemented into mobile banking application executing on a mobile device (e.g., client device 202).

PoS device 200 may include and/or cooperate with weighing scales, scanners, electronic and manual cash registers, electronic funds transfer at point of sale (EFTPOS) terminals, touch screens and any other wide variety of hardware and software available for use with PoS device 200. PoS device 200 may be a retail point of sale system and may include a cash register and/or cash register-like computer components to enable purchase transactions. PoS device 200 also may be a hospitality point of sale system and include computerized systems incorporating registers, computers and peripheral equipment, usually on a computer network to be used in restaurant, hair salons, hotels or the like. PoS device 200 may be a wireless point of sale device similar to a PoS device described herein or, for example a tablet computer that is configured to operate as a PoS device, including for example, software to cause the tablet computer to execute point of sale functionality and a card reader such as for example the Capital One® SparkPay card reader, the Square® reader, Intuit's® GoPayment reader, or the like. PoS device 200 also may be a cloud-based point of sale system that can be deployed as software as a service, which can be accessed directly from the Internet using, for example, an Internet browser.

Referring to FIG. 2, an example PoS device 200 is shown. PoS device 200 may include a controller 202, a reader interface 204, a data interface 206, a smartcard reader 208, a magnetic stripe reader 210, a near-field communications (NFC) reader 212, a power manager 214, a keypad 216, an audio interface 218, a touchscreen/display controller 220, and a display 222. Also, PoS device 200 may be coupled with, integrated into or otherwise connected with a cash register/retail enterprise system 224.

In various embodiments, Controller 202 may be any controller or processor capable of controlling the operations of PoS device 200. For example, controller 202 may be an Intel® 2nd Generation Core™ i3 or i5 or Pentium™ G850 processor or the like. Controller 202 also may be a controller included in a personal computer, smartphone device, tablet PC or the like.

Reader interface 204 may provide an interface between the various reader devices associated with PoS device 200 and PoS device 200. For example, reader interface 204 may provide an interface between smartcard reader 208, magnetic stripe reader 210, NFC reader 212 and controller 202. In various embodiments, reader interface 204 may be a wired interface such as a USB, RS222 or RS485 interface and the like. Reader interface 204 also may be a wireless interface and implement technologies such as Bluetooth, the 802.11(x) wireless specifications and the like. Reader interface 204 may enable communication of information read by the various reader devices from the various reader devices to PoS device 200 to enable transactions. For example, reader interface 204 may enable communication of a credit or debit card number read by a reader device from that device to PoS device 200. In various embodiments, reader interface 204 may interface between PoS device 200 and other devices that do not necessarily "read" information but instead receive information from other devices.

Data interface 206 may allow PoS device 200 to pass communicate data throughout PoS device and with other devices including, for example, cash register/retail enterprise system 224. Data interface 206 may enable PoS device 200 to integrate with various customer resource management (CRM) and/or enterprise resource management (ERP) systems. Data interface 206 may include hardware, firmware and software that make aspects of data interface 206 a wired interface. Data interface 206 also may include hardware, firmware and software that make aspects of data interface 206 a wireless interface. In various embodiments, data interface 206 also enables communication between PoS device other devices.

Smartcard reader 208 may be any electronic data input device that reads data from a smart card. Smartcard reader 208 may be capable of supplying an integrated circuit on the smart card with electricity and communicating with the smart card via protocols, thereby enabling read and write functions. In various embodiments, smartcard reader 208 may enable reading from contact or contactless smart cards. Smartcard reader 208 also may communicate using standard protocols including ISO/IEC 7816, ISO/IEC 14443 and/or the like or proprietary protocols.

Magnetic stripe reader 210 may be any electronic data input device that reads data from a magnetic stripe on a credit or debit card, for example. In various embodiments, magnetic stripe reader 210 may include a magnetic reading head capable of reading information from a magnetic stripe. Magnetic stripe reader 210 may be capable of reading, for example, cardholder information from tracks 1, 2, and 3 on magnetic cards. In various embodiments, track 1 may be written on a card with code known as DEC SIXBIT plus odd parity and the information on track 1 may be contained in several formats (e.g., format A, which may be reserved for proprietary use of the card issuer; format B; format C-M which may be reserved for us by ANSI subcommittee X3B10; and format N-Z, which may be available for use by individual card issuers). In various embodiments, track 2 may be written with a 5-bit scheme (4 data bits plus 1 parity). Track 3 may be unused on the magnetic stripe. In various embodiments, track 3 transmission channels may be used for transmitting dynamic data packet information to further enable enhanced token-based payments. Track 3 transmission channels also may be used to transmit, for example, geolocation data associated with a user, product data relating to the purchase (e.g., product information, stock keeping unit (SKU) level data, and/or any other information that may be used to provide purchase-driven smart statements. PoS device 200 may communicate and or cooperate with the user device to provide the information into track 3 transmission channels. Other methods for providing product level data to a financial institution. For example, a merchant can transmit the product data for each transaction to a financial institution along with information that identifies the transaction.

NFC reader 212 may be any electronic data input device that reads data from an NFC device. In an exemplary embodiment, NFC reader 212 may enable Industry Standard NFC Payment Transmission. For example, the NFC reader 212 may communicate with an NFC enabled device to enable two loop antennas to form an air-core transformer when placed near one another by using magnetic induction. NFC reader 212 may operate at 13.56 MHz or any other acceptable frequency. Also, NFC reader 212 may enable a passive communication mode, where an initiator device provides a carrier field, permitting answers by the target device via modulation of existing fields. Additionally, NFC reader 212 also may enable an active communication mode by allowing alternate field generation by the initiator and target devices.

In various embodiments, NFC reader 212 may deactivate an RF field while awaiting data. NFC reader 212 may receive communications containing Miller-type coding with varying modulations, including 100% modulation. NFC reader 212 also may receive communications containing Manchester coding with varying modulations, including a modulation ratio of approximately 10%, for example. Additionally, NFC reader 212 may be capable of receiving and transmitting data at the same time, as well as checking for potential collisions when the transmitted signal and received signal frequencies differ.

NFC reader 212 may be capable of utilizing standardized transmission protocols, for example but not by way of limitation, ISO/IEC 14443 A/B, ISO/IEC 18092, MiFare, FeliCa, tag/smartcard emulation, and the like. Also, NFC reader 212 may be able to utilize transmission protocols and methods that are developed in the future using other frequencies or modes of transmission. NFC reader 212 also may be backwards-compatible with existing payment techniques, such as, for example RFID. Also, NFC reader 212 may support transmission requirements to meet new and evolving payment standards including internet-based transmission triggered by NFC. In various embodiments, NFC reader 212 may utilize MasterCard's® PayPass and/or Visa's® PayWave and/or American Express® ExpressPay systems to enable transactions.

Although not shown and described, other input devices and/or readers, such as for example, barcode readers and the like are contemplated.

Power manager 214 may be any microcontroller or integrated circuit that governs power functions of PoS device 200. Power manager 214 may include, for example, firmware, software, memory, a CPU, a CPU, input/output functions, timers to measure intervals of time, as well as analog to digital converters to measure the voltages of the main battery or power source of PoS device 200. In various embodiments, Power manager 214 remain active even when PoS device 200 is completely shut down, unused, and/or powered by the backup battery. Power manager 214 may be responsible for coordinating many functions, including, for example, monitoring power connections and battery charges, charging batteries when necessary, controlling power to other integrated circuits within PoS device 200 and/or other peripherals and/or readers, shutting down unnecessary system components when they are left idle, controlling sleep and power functions (on and off), managing the interface for built-in keypad and trackpads, and/or regulating a real-time clock (RTC).

Keypad 216 may any input device that includes a set of buttons arranged, for example, in a block or pad and may bear digits, symbols and/or alphabetical letters. Keypad 216 may be a hardware-based or mechanical-type keypad and/or implemented in software and displayed on, for example, a screen or touch screen to form a keypad. Keypad 216 may receive input from a user that pushed or otherwise activates one or more buttons on keypad 216 to provide input.

Audio interface 218 may be any device capable of providing audio signals from PoS device 200. For example, audio interface may be a speaker or speakers that may produce audio signals. In various embodiments, audio interface 218 may be integrated within PoS device 200. Audio interface 218 also may include components that are external to PoS device 200.

Touchscreen/display control 220 may be any device or controller that controls an electronic visual display. Touchscreen/display control 220 may allow a user to interact with PoS device 200 through simple or multi-touch gestures by touching a screen or display (e.g., display 222). Touchscreen/display control 220 may be configured to control any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, touchscreen/display control 220 may receive inputs from the touchscreen and process the received inputs. Touchscreen/display control 220 also may control the display on PoS device 200, thereby providing the graphical user interface on a display to a user of PoS device 200.

Display 222 may be any display suitable for a PoS device. For example, display 222 may be a TFT, LCD, LED or other display. Display 222 also may be a touchscreen display that for example allows a user to interact with PoS device 200 through simple or multi-touch gestures by touching a screen or display (e.g., display 222). Display 222 may include any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, 222 may receive inputs from control gestures provided by a user. Display 222 also may display images, thereby providing the graphical user interface to a user of PoS device 200.

Cash register/retail enterprise system 224 may me any device or devices that cooperate with PoS device 200 to process transactions. Cash register/retail enterprise system 224 may be coupled with other components of PoS device 200 via, for example, a data interface (e.g., data interface 206) as illustrated in FIG. 2. Cash register/retail enterprise system 224 also may be integrated into PoS device 200.

In various embodiments, cash register/retail enterprise system 224 may be a cash register. Example cash registers may include, for example, mechanical or electronic devices that calculate and record sales transactions. Cash registers also may include a cash drawer for storing cash and may be capable of printing receipts. Cash registers also may be connected to a network to enable payment transactions. Cash registers may include a numerical pad, QWERTY or custom keyboard, touch screen interface, or a combination of these input methods for a cashier to enter products and fees by hand and access information necessary to complete the sale.

In various embodiments, cash register/retail enterprise system 224 may comprise a retail enterprise system and/or a customer relationship management system. Retail enterprise system 224 may enable retain enterprises to manage operations and performance across a retail operation. Retail enterprise system 224 may be a stand-alone application in, for example, individual stores, or may be interconnected via a network. Retail enterprise system 224 may include various point of sale capabilities, including the ability to, for example, customize and resize transaction screens, work with a "touch screen" graphical user interface, enter line items, automatically look up price (sales, quantity discount, promotional, price levels), automatically compute tax, VAT, look up quantity and item attribute, display item picture, extended description, and sub-descriptions, establish default shipping services, select shipping carrier and calculate shipping charges by weight/value, support multi-tender transactions, including cash, check, credit card, and debit card, accept food stamps, place transactions on hold and recall, perform voids and returns at POS, access online credit card authorizations and capture electronic signatures, integrate debit and credit card processing, ensure optional credit card discounts with address verification, support mix-and-match pricing structure, discount entire sale or selected items at time of sale, add customer account, track customer information, including total sales, number of visits, and last visit date. issue store credit, receive payment(s) for individual invoices, process deposits on orders, search by customer's ship-to address, create and process layaway, back orders, work orders, and sales quotes, credit items sold to selected sales reps, view daily sales graph at the PoS, view and print journals from any register, preview, search, and print journals by register, batch, and/or receipt number, print X, Z, and ZZ reports, print receipts, invoices, and pick tickets with logos/graphics, print kit components on receipt, reprint receipts, enter employee hours with an integrated time clock function, and/or sell when the network/server is down with an offline PoS mode. Retail enterprise system 224 also may include inventory control and tracking capabilities, reporting tools, customer management capabilities, employee management tools, and may integrate with other accounting software.

Figure 3:
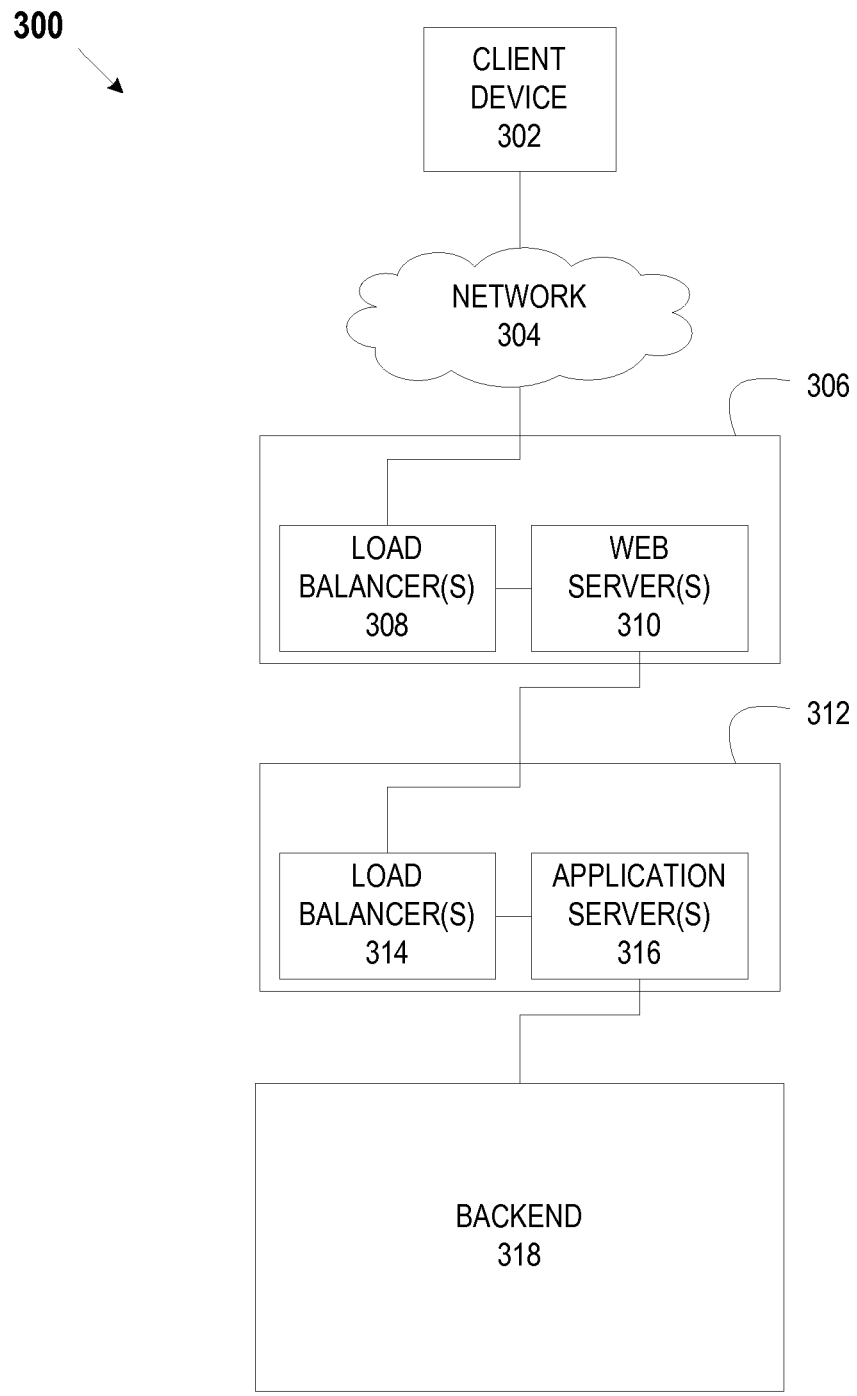
FIG. 3 depicts a schematic diagram of a system for providing a spend memory record to an account holder at his or her mobile device according to an example embodiment of the disclosure.

FIG. 3 depicts an example system 300 that may enable a financial institution, for example, to provide network services to its customers. Example system 300 also illustrates examples of merchant systems (e.g., merchant 107). Merchant systems similar to system 300 may enable a financial institution and merchant, for example, to grocery budgeting application to users of client devices (e.g., client device 302). Client device 302 may be similar to the user device used by account holder 106 as described above. Also, network 304 may be similar to network 108 of FIG. 1.

As shown in FIG. 3, system 300 may include a client device 302, a network 304, a front-end controlled domain 306, a back-end controlled domain 312, and a backend 318. Front-end controlled domain 306 may include one or more load balancers 308 and one or more web servers 310. Back-end controlled domain 312 may include one or more load balancers 314 and one or more application servers 316.

Client device 302 may be a network-enabled computer. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 300 may execute one or more software applications to enable, for example, network communications.

Client device 302 also may be a mobile device. For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/ or any other smartphone or like wearable mobile device.

Network 304 may be one or more of a wireless network, a wired network, or any combination of a wireless network and a wired network. For example, network 110 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 110 may include, without limitation, telephone lines, fiber optics, IEEE Ethernet 902.3, a wide area network (WAN), a local area network (LAN) or a global network such as the Internet. Also, network 110 may support an Internet network, a wireless communication network, a cellular network, or the like, or any combination thereof. Network 110 may further include one network, or any number of example types of networks mentioned above, operating as a stand-alone network or in cooperation with each other. Network 110 may utilize one or more protocols of one or more network elements to which they are communicatively couples. Network 110 may translate to or from other protocols to one or more protocols of network devices. Although network 110 is depicted as a single network, it should be appreciated that according to one or more embodiments, network 110 may comprise a plurality of interconnected networks, such as, for example, the Internet, a service provider's network, a cable television network, corporate networks, and home networks.

Front-end controlled domain 306 may be implemented to provide security for backend 318. Load balancer(s) 308 may distribute workloads across multiple computing resources, such as, for example computers, a computer cluster, network links, central processing units or disk drives. In various embodiments, load balancer(s) 310 may distribute workloads across, for example, web server(S) 316 and/or backend 318 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 308 may include software that monitoring the port where external clients, such as, for example, client device 302, connect to access various services of a financial institution, for example. Load balancer(s) 308 may forward requests to one of the application servers 316 and/or backend 318 servers, which may then reply to load balancer 308. This may allow load balancer(s) 308 to reply to client device 302 without client device 302 ever knowing about the internal separation of functions. It also may prevent client devices from contacting backend servers directly, which may have security benefits by hiding the structure of the internal network and preventing attacks on backend 318 or unrelated services running on other ports, for example.

A variety of scheduling algorithms may be used by load balancer(s) 308 to determine which backend server to send a request to. Simple algorithms may include, for example, random choice or round robin. Load balancers 308 also may account for additional factors, such as a server's reported load, recent response times, up/down status (determined by a monitoring poll of some kind), number of active connections, geographic location, capabilities, or how much traffic it has recently been assigned.

Load balancers 308 may be implemented in hardware and/or software. Load balancer(s) 308 may implement numerous features, including, without limitation: asymmetric loading; Priority activation: SSL Offload and Acceleration; Distributed Denial of Service (DDoS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Web server(s) 310 may include hardware (e.g., one or more computers) and/or software (e.g., one or more applications) that deliver web content that can be accessed by, for example a client device (e.g., client device 302) through a network (e.g., network 304), such as the Internet. In various examples, web servers, may deliver web pages, relating to, for example, online banking applications and the like, to clients (e.g., client device 302). Web server(s) 310 may use, for example, a hypertext transfer protocol (HTTP or HTTPS) to communicate with client device 302. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP and web server 310 may respond with the content of that resource or an error message if unable to do so. The resource may be, for example a file on stored on backend 318. Web server(s) 310 also may enable or facilitate receiving content from client device 302 so client device 302 may be able to, for example, submit web forms, including uploading of files.

Web server(s) also may support server-side scripting using, for example, Active Server Pages (ASP), PHP, or other scripting languages. Accordingly, the behavior of web server(s) 310 can be scripted in separate files, while the actual server software remains unchanged.

Load balancers 314 may be similar to load balancers 308 as described above.

Application server(s) 316 may include hardware and/or software that is dedicated to the efficient execution of procedures (e.g., programs, routines, scripts) for supporting its applied applications. Application server(s) 316 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 316 may act as a set of components accessible to, for example, a financial institution or other entity implementing system 300, through an API defined by the platform itself. For Web applications, these components may be performed in, for example, the same running environment as web server(s) 310, and application servers 316 may support the construction of dynamic pages. Application server(s) 316 also may implement services, such as, for example, clustering, fail-over, and load-balancing. In various embodiments, where application server(s) 316 are Java application servers, the web server(s) 316 may behaves like an extended virtual machine for running applications, transparently handling connections to databases associated with backend 318 on one side, and, connections to the Web client (e.g., client device 302) on the other.

Backend 318 may include hardware and/or software that enables the backend services of, for example, a financial institution or other entity that maintains a distributed system similar to system 300. For example, backend 318 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and the like. Backend 318 may be associated with various databases, including account databases that maintain, for example, customer account information, product databases that maintain information about products and services available to customers, content databases that store content associated with, for example, a financial institution, and the like. Backend 318 also may be associated with one or more servers that enable the various services provided by system 300.

In various examples, backend 318 may include similar components as financial institution 101. In these examples, backend 318 may enable a financial institution, along with the various databases, communication modules and processors associated therewith to provide a spend memory record to, for example, users of mobile device 302. Backend 318 also may include various backend components that may be associated with a merchant. For example, backend 318 may include systems similar to the retail enterprise system 224 as shown and described above in FIG. 2.

Figure 4:
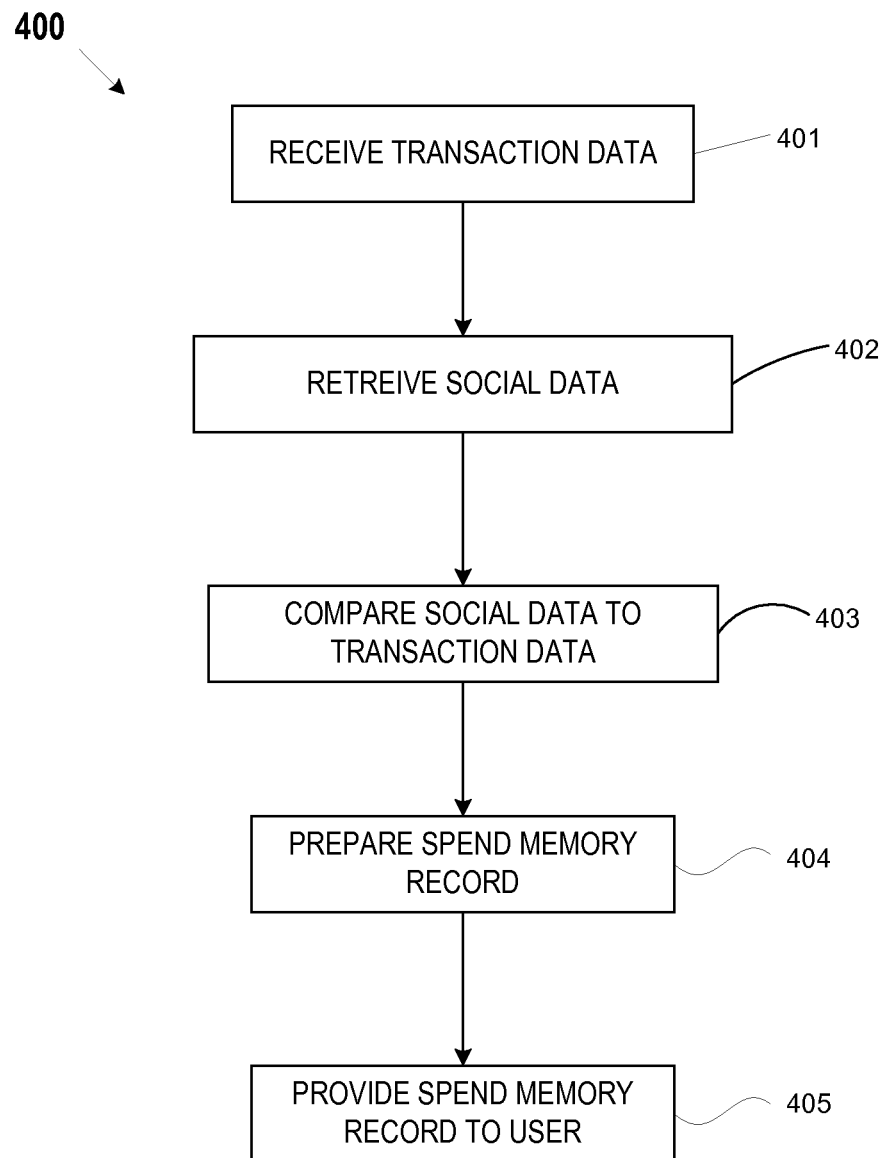
FIG. 4 depicts a schematic diagram of a method for providing a spend memory record to an account holder at his or her mobile device according to an example embodiment of the disclosure.

FIG. 4 is a flow chart illustrating a method for providing a spend memory record to an account holder at his or her mobile device. The method 400 shown in FIG. 4 can be executed or otherwise performed by one or more combinations of various systems. The method 400 as described below may be carried out by the system for providing a spend memory record to an account holder at his or her mobile device as shown in FIGS. 1-3 and 5A-5B, by way of example, and various elements of that system are referenced in explaining the method of FIG. 4. Each block shown in FIG. 4 represents one or more processes, methods, or subroutines in the example method 400. Referring to FIG. 4, the example method 400 may begin at block 401.

In block 401, transaction data may be received via a network from a merchant and/or third-party payment processor. The transaction data may be associated with a financial transaction performed via a financial account held by the account holder. The transaction data may be associated with a financial transaction performed by the account holder at a POS location using a card (e.g., a credit card/debit card) and/or account holder's mobile device. The account holder may purchase one or more goods or services at the POS location, and the resulting expenses may be charged against the account holder's account.

Transaction data may include, for example, the dollar amount of the transaction; the transaction location data (e.g., the physical address of the merchant and/or GPS coordinates associated with the merchant location); transaction timestamp data (the date and time of the transaction); product information; any rewards points earned by account holder as a result of the transaction; any logos used by the merchant; and any receipts associated with the transaction. In one example, an account holder may be traveling on a road trip from Richmond, Va. to Daytona Beach, Fla. During the trip, the account holder may stop in Savannah, Ga. and buy dinner on Aug. 20, 2014 at an Applebee's restaurant. The transaction data from this purchase may include the transaction timestamp (Aug. 20, 2014, 6:30:20 PM). The transaction data may include the transaction location (e.g., the address and/or GPS coordinates associated with Applebee's). Spend memory processor 104 may receive the transaction data. Method 400 may proceed to block 402.

In block 402 social data may be retrieved via from a social networking site associated with the account holder. Social data may be retrieved via a network using a social API, for example, that links a financial institution with a social networking site. Social data may include photos and videos that the account holder posts to his social media accounts. Social data can include tweets, pins, tags, check-ins, likes, status updates, comments, profile information, posts, and other information. The account holder may have previously opted-in to receive spend memory records from spend memory processor 104. At that time, social networking site 110 may have created a hashcode to allow spend memory processor 104 to access social data from the account holder's social media accounts. The hashcode may be associated with one or more limitations set by the account holder during the opt-in process. The limitations may relate to the types of social data that spend memory processor 104 can retrieve. In this example, the account holder may have set limitations permitting the spend memory processor 104 to retrieve photos and videos from his social media account, along with status updates, posts, comments, and likes.

Spend memory processor 104 may provide the hashcode to social networking site 110 in order to retrieve social data. Social networking site 110 may provide the social data to spend memory processor 104 based on the hashcode and the associated limitations. In this example, while in Savannah, Ga., the account holder may have taken a photo of a location in the city and posted it to his social media account. The account holder may have labeled the photo within an album called "Road Trip to Daytona Beach". The photo may include social location data (e.g., a physical address and/or GPS coordinates associated with the location where the photo was taken and/or uploaded). The social location data may have been added to the photo by the user's mobile device and/or by social networking site 110 when the account holder first uploaded the photo. The account holder may have also posted a status update "Passing through Savannah, Ga." to his social media account. Social networking site 110 may provide this social data to spend memory processor 104 in response to a request for social data that includes the hashcode. The social data may include social timestamp data (e.g., indicating the date and time when the social data was created and/or uploaded to social networking site 110). In this example, the social timestamp data for the photo may be Aug. 20, 2014, 5:50:20 PM, and the social timestamp data for the status update may be Aug. 20, 2014, 5:30:15 PM.

In various embodiments, during the initial opt-in process, the account holder may also provide spend memory processor 104 with permission to pull data directly from the account holder's mobile device (e.g., photos, videos, notes, call records). In this example, the account holder did not provide spend memory processor 104 with this permission, and thus spend memory processor 104 will not pull this data from the account holder's mobile device. In various embodiments, local data stored, for example, on a mobile device also may be retrieved in block 402. An API may be used in a similar manner as describe above to retrieve the local data. Method 400 may proceed to block 403.

At block 403, social data may be compared to the transactional data. Spend memory processor 104 may compare the received social data, including any retrieved local data, with the received transactional data. The comparison may include comparing the transactional location data with the social location data. The comparison may include comparing the transactional timestamp data with the social timestamp data. Spend memory processor 104 may look for matches based on one or more thresholds, including a location threshold and a time threshold. In this example, the location threshold may be social location data that is within 10 miles of transactional location data. In this example, the time threshold may be social timestamp data that is within 12 hours of the transactional timestamp data. Spend memory processor 104 may determine that the social timestamp data for the photo and the status update is within 12 hours of the transactional timestamp data for the account holder's meal at Applebee's. Spend memory processor 104 may determine that the social locational data for the status update and the photo may be within 10 miles of the transactional location data for the account holder's meal at Applebee's. Method 400 may proceed to block 404.

At block 404, a spend memory record may be prepared based on the matches determined in block 403. In this example, the spend memory record may be a graphical user interface (GUI) that shows each transaction record and the associated social data. The spend memory record may include transactional data from the account holder's Applebee's purchase, including the location, date and time, merchant name, purchase amount, and/or a merchant logo. The spend memory record may also include the social data, including the photo and the status update. The spend memory record may include text and/or links describing the purchase, based on the transaction data and the social data (e.g., "bought dinner at Applebee's during your Roadtrip to Daytona Beach"). Method 400 may proceed to block 405.

At block 405, the spend memory record may be provided to the account holder's mobile device. The account holder may view the spend memory record on his mobile device using a mobile banking application (such as mobile banking application 103). The user interface for the spend memory record may allow the account holder to customize the display.

It is further noted that the software described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded as an illustrative rather than restrictive sense.

What is claimed is:

1. A system comprising:
   one or more processors; and
   a memory in communication with the one or more processors and storing instructions that, when executed by the one or more processors, are configured to cause the system to:
   receive, from a financial account holder via a mobile application, one or more permissions, wherein each permission enables the one or more processors to receive one or more types of social data from an account of the financial account holder;
   cause a user device to display, via the mobile application, a list of one or more financial transactions;
   receive, from the user device via the mobile application, a selection of a first input associated with a first financial transaction of the one or more financial transactions;

in response to receiving the selection of the first input:
    retrieve, from a database, transaction data associated with the first financial transaction;
    request the one or more types of social data from the account; and
    generate a spend memory record associated with the first financial transaction, the spend memory record based on one or more similarities between the transaction data and the one or more types of social data; and
cause the user device to display, via the mobile application, the spend memory record comprising the transaction data and the one or more types of social data.

2. The system of claim 1, wherein at least one of the one or more types of social data identifies one or more individuals other than the financial account holder potentially associated with the first financial transaction.

3. The system of claim 1, wherein the transaction data comprises one or more of a transaction amount, a transaction timestamp, a transaction location, product information, or a merchant logo.

4. The system of claim 1, wherein the spend memory record comprises one or more of: an account number, a merchant name associated with the first financial transaction, or a text description of the first financial transaction.

5. The system of claim 1, wherein the one or more permissions further enable the one or more processors to retrieve local data from a mobile device; and
    wherein the local data comprises one or more of a device timestamp, a device location, a photo, a video, a call log, or a text message.

6. The system of claim 1, wherein the instructions are further configured to cause the system to:
    receive, from the user device via the mobile application, a confirmation of the first financial transaction from the financial account holder.

7. A system comprising:
one or more processors; and
a memory in communication with the one or more processors and storing instructions that, when executed by the one or more processors, are configured to cause the system to:
    receive, from a financial account holder via a mobile application, one or more permissions, wherein each permission enables the one or more processors to retrieve one or more types of social data from an account of the financial account holder;
    cause a user device to display, via the mobile application, a list of one or more financial transactions;
    receive, from the user device via the mobile application, a selection of a first input associated with a first financial transaction of the one or more financial transactions;
    in response to receiving the selection of the first input:
        retrieve, from one or more databases, transaction data associated with the first financial transaction and the one or more types of social data; and
        generate a spend memory record associated with the first financial transaction, the spend memory record based on the transaction data and the one or more types of social data; and
    cause the user device to display, via the mobile application, the spend memory record comprising the transaction data and the one or more types of social data.

8. The system of claim 7, wherein at least one of the one or more types of social data identifies one or more individuals other than the financial account holder potentially associated with the first financial transaction.

9. The system of claim 7, wherein the transaction data comprises one or more of a transaction amount, a transaction timestamp, a transaction location, product information, or a merchant logo.

10. The system of claim 7, wherein the transaction data comprises a transaction location and a transaction timestamp, and each of the one or more types of social data comprises a social activity location and a social activity timestamp.

11. The system of claim 10, wherein generating the spend memory record comprises comparing the transaction location and each respective social activity location, and the transaction timestamp and each respective social activity timestamp.

12. The system of claim 7, wherein the spend memory record comprises one or more of: an account number, a merchant name associated with the first financial transaction, or a text description of the first financial transaction.

13. The system of claim 7, wherein the one or more permissions further enable the one or more processors to retrieve local data from a mobile device; and
    wherein the local data comprises one or more of a device timestamp, a device location, a photo, a video, a call log, or a text message.

14. The system of claim 7, wherein the instructions are further configured to cause the system to:
    query the financial account holder, via the mobile application, to confirm the first financial transaction.

15. A user device comprising:
one or more processors;
a transceiver;
a screen to display a graphical user interface (GUI) associated with a mobile application; and
memory, comprising the mobile application, and in communication with the transceiver, the one or more processors, and the screen, the memory including instructions that, when executed, cause the one or more processors to:
    receive, from a financial account holder via the mobile application, one or more first inputs to create one or more permissions, wherein each permission enables a spend memory processor associated with a financial institution to retrieve one or more types of social data from an account of the financial account holder;
    display, on the GUI, a list of one or more financial transactions;
    receive, at the GUI, a selection of a second input associated with a first financial transaction of the one or more financial transactions;
    in response to receiving the selection of the second input, send, with the transceiver, a request for a spend memory record associated with the first financial transaction to the spend memory processor;
    receive, from the spend memory processor via the transceiver, the spend memory record comprising transaction data associated with the first financial transaction and the one or more types of social data; and
    display, on the GUI, the spend memory record.

16. The user device of claim 15, wherein at least one of the one or more types of social data identifies one or more individuals other than the financial account holder potentially associated with the first financial transaction.

17. The user device of claim 15, wherein the one or more types of social data comprise one or more of a photo, a video, a tag, a post, a pin, a tweet, a status update, or combinations thereof.

18. The user device of claim 15, wherein each of the one or more permissions further enables the spend memory processor to retrieve local data from a mobile device; and
   wherein the local data comprises one or more of a device timestamp, a device location, a photo, a video, a call log, or a text message.

19. The user device of claim 15, wherein the instructions are further configured to cause the one or more processors to:
   receive, at the GUI, a confirmation of the first financial transaction from the financial account holder.

20. The user device of claim 15, wherein the instructions are further configured to cause the one or more processors to:
   receive, at the GUI, a confirmation that the one or more types of social data are associated with the first financial transaction.

\* \* \* \* \*